United States Patent [19]
Kaupas et al.

[11] 3,985,523

[45] Oct. 12, 1976

[54] POLLUTION CONTROL PROCESS FOR FERTILIZER PLANT

[75] Inventors: Philip F. Kaupas, Denville; Dellason F. Bress, Murray Hill, both of N.J.

[73] Assignee: Foster Wheeler Energy Corporation, Livingston, N.J.

[22] Filed: Feb. 13, 1976

[21] Appl. No.: 657,896

Related U.S. Application Data

[63] Continuation-in-part of Ser. No. 510,333, Sept. 30, 1974, abandoned.

[52] U.S. Cl. .................................. 55/70; 55/94; 71/28; 71/59; 71/64 DB
[51] Int. Cl.² .................. B01D 47/06; C05C 9/00
[58] Field of Search ............. 55/68, 70, 84, 85, 90, 55/93, 94, 222, 223, 229, 233; 71/28, 59, 64 DB

[56] References Cited
UNITED STATES PATENTS

| | | | |
|---|---|---|---|
| 3,344,585 | 10/1967 | Hollowell | 55/70 |
| 3,395,510 | 8/1968 | Barnes | 55/94 X |
| 3,798,021 | 3/1974 | Bress et al. | 55/70 X |

*Primary Examiner*—Charles N. Hart
*Assistant Examiner*—Robert H. Spitzer
*Attorney, Agent, or Firm*—Marvin A. Naigur; John E. Wilson

[57] ABSTRACT

In a continuous process for the manufacture of fertilizer, contaminated condensate containing waste heat from the process is passed in heat exchange relation with a stream of contaminated air and entrained fertilizer solids. In this manner it is possible to remove substantially pure water vapor and air together with the fertilizer containing solution which can be used in the manufacture of the fertilizer.

6 Claims, 6 Drawing Figures

POLLUTION CONTROL PROCESS FOR FERTILIZER PLANT

CROSS-REFERENCE TO RELATED APPLICATION

The present application is a continuation-in-part of application Ser. No. 510,333, filed on Sept. 30, 1974 now abandoned.

BACKGROUND OF THE INVENTION

In conventional processes for the production of nitrogen fertilizers, ammonium nitrate and urea are initially synthesized with relatively large quantities of water. In the final stages of drying and solidifying the fertilizer into a substantially anhydrous product, water, which is contaminated with the fertilizer and its components, is removed. Further, conventional solidification methods result in large quantities of air being contaminated with entrained fertilizer dust. Accordingly, it is an object of the present invention to remove contaminants from the air discharged from the process and to eliminate a liquid water discharge from the process.

In an ammonium nitrate plant, ammonia and air are reacted to produce nitrogen dioxide, and subsequently, the nitrogen dioxide and water are combined to produce nitric acid. The nitric acid is neutralized with ammonia to produce an ammonium nitrate solution which is then conducted to an evaporator for obtaining a concentrated ammonium nitrate mixture which is sent to a solidification operation where small particles of ammonium nitrate are produced. This operation consists of either prilling or granulating the melt from this evaporator by cooling with air.

The present invention as applied to an ammonium nitrate process is primarily concerned with three pollution streams, namely, a first stream from the neutralizer, containing ammonia, nitric acid, ammonium nitrate, and water vapor, a second stream from the solidification stage containing air and entrained particles of ammonium nitrate, and a third stream from the evaporator contaminated by ammonia, nitric acid, ammonium nitrate and water.

For production of high density ammonium nitrate product, an air swept evaporator is sometimes used and the contaminated air from such a unit is combined with the second stream before it enters the pollution control system. Conventionally, the first and third streams are either passed to the atmosphere or condensed and discharged as a liquid effluent. The second stream is usually exhausted to the atmosphere.

Contaminants noted in the first and third streams constitute very serious pollutants to waste water streams. Usually local pollution control agencies place severe limitations on the quantities discharged. Likewise, the entrained particles and traces of ammonia in the second stream are serious pollutants which are usually restricted.

In a urea process, a similar concept applies. Ammonia and carbon dioxide are reacted at high temperature and pressure to produce a urea water solution which contains large amounts of unconverted reactants. Most of the reactants are recovered from the urea solution and are recycled back to the reaction step. The remaining reactants are separated from the urea in the evaporation step along with the water produced as a by-product of urea synthesis. The evaporated water together with residual ammonia, carbon dioxide, and entrained urea are condensed and collected as raw process condensate, which is then steam stripped as a process condensate treatment step to produce process condensate containing traces of ammonia, carbon dioxide, and urea. Stripped ammonia and carbon dioxide are recycled to synthesis. The urea melt from evaporation is solidified in a similar manner to that described above for ammonia nitrate in which either prills or granules are produced by contact with air.

The present invention as applied to a urea process is primarily with two pollution streams, namely, a stream of process condensate from the process condensate treatment step containing traces of ammonia, carbon dioxide, and urea and a second stream of air from the solidification step containing entrained particles of urea and a trace of ammonia. Conventionally, the first stream is discharged to a sewer, but usually must be treated further to reduce the urea content. This reduction in urea is accomplished by hydrolyzing the urea back to ammonia and carbon dioxide and steam stripping these out of the condensate to be recycled back to synthesis. Nevertheless, even after this treatment, the level of contaminants is still usually intolerable by local pollution control waste water standards.

The second stream, similar to the case of ammonium nitrate is conventionally discharged into the atmosphere. In the case of granulation, the entrained urea content is usually much greater than for prilling and a single stage conventional type scrubber is used to remove most of the urea dust by contact with water.

In accordance with the present invention, polluting waste products generally produced in nitrogen fertilizer processes can be substantially removed from the air stream effluent so as to render the air effluent non-polluting. Furthermore, the present invention eliminates liquid water effluent streams from the process, which are generally contaminated, by evaporating by-product water into the air stream effluent. Heat used in the evaporation of by-product water is relatively low temperature waste heat that would otherwise be transferred to a conventional cooling water system. Thus, cooling water load for the process is reduced thereby reducing the cooling water blowdown effluent which is generally contaminated with treatment agents. The present invention provides for the use of materials that ordinarily would contaminate the environment and liquid effluent streams in conventional processes are returned to the process for use in the manufacture of fertilizer.

SUMMARY OF THE INVENTION

In accordance with illustrative embodiments demonstrating objects and features of the present invention, there is provided a continuous process for the manufacture of nitrogen fertilizer. Accordingly, in the first embodiment of the process for producing ammonium nitrate, during a neutralization stage, a first pollutant stream containing water vapor and contaminants produced during the manufacture of fertilizer is condensed by direct or indirect heat exchange with a circulating stream of fertilizer solution. The process condensate is combined with the circulating stream, resulting in a heated pollution stream, which is introduced into the upper section of the pollution control system where it is brought into direct contact with a second pollution stream of air and entrained fertilizer solids from the solidification stage. The pollution control system may consist of one, two (double contact stage) or more contact stages. In a double contact stage pollution control system, the entrained fertilizer solids are nearly totally removed from the polluted air and vapor streams by dissolution into a circulated fertilizer solution streams resulting from the pollution streams in the pollution control system. Simultaneously with the absorption of contaminants by the circulated fertilizer solution, water evaporates from the circulated fertilizer solution process condensate into the air-vapor stream resulting in cooling of the circulated fertilizer solution. The cooled circulated fertilizer solution is circulated to the evaporation condensers and to the neutralization stage to be reheated by absorption of the heat of condensing vapors from evaporation and neutralization, respectively.

In a double contact stage pollution control system, excess liquid from the stream of condensate recirculated over the upper contacting medium is passed over the lower contacting medium in order to replenish water losses due to recycling the circulated fertilizer solution back to the fertilizer process and due to evaporation of water into the air-vapor stream. The quantity of water evaporated from both recirculating streams into the clean air effluent from the second contacting medium is equivalent to the amount of water generated by the fertilizer process so that no liquid waste stream is discharged. This water is discharged from the process as uncontaminated water vapor in the uncontaminated air effluent from the second contacting medium.

In the second embodiment of the process for production of urea, in a double contact stage pollution control system, a stream corresponding to the aforementioned second stream, containing air and entrained fertilizer is passed through both contacting mediums as described above and scrubbed with recirculating fertilizer solution. Process condensate from evaporation containing pollutants is recovered directly or indirectly by utilizing a recirculated stream of fertilizer solution from the upper contacting medium. Recovered condensate is treated to remove ammonia before being combined with that recirculated stream. In this way, the ammonia concentration in the recirculated stream is maintained sufficiently low so as to prevent ammonia from contaminating the effluent air discharge from the second contacting medium.

BRIEF DESCRIPTION OF THE DRAWINGS

The above brief description as well as further objects, features, and advantages of the present invention will be more fully appreciated by referring to the following description of presently preferred but nonetheless illustrative embodiments in accordance with the present invention when taken in connection with the accompanying drawings, wherein.

BRIEF DESCRIPTION OF THE PREFERRED EMBODIMENTS

I. Ammonium Nitrate Process

Figure 1:
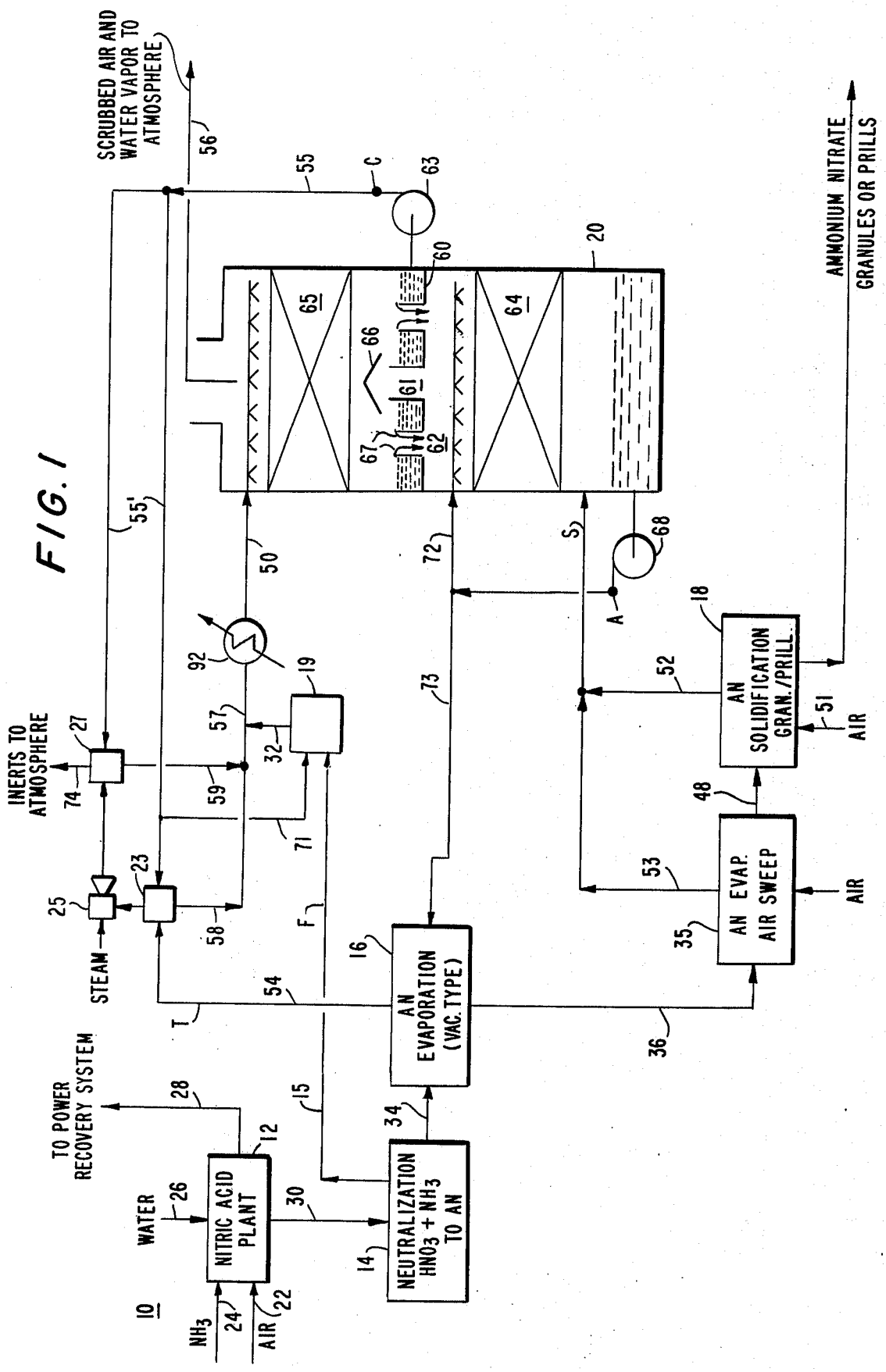
FIG. 1 is a schematic representation of an ammonium nitrate process incorporating the present invention, having a double contact stage pollution control system.

Referring now specifically to FIG. 1 of the drawings, there is shown an ammonium nitrate process generally designated by the reference numeral 10, which comprises an oxidation and absorption zone 12, a neutralization and adjustment zone 14, evaporation zone 16, a prilling tower 18, and a pollution control system 20.

As is typical in the production of ammonium nitrate, nitric acid is first made in zone 12 by introducing ammonia and air by line 24 and line 22, respectively, to produce nitrogen oxide, which is further oxidized into nitrogen dioxide and passed into the absorption section of zone 12 where it is absorbed in water introduced by line 26 to form nitric acid. A small amount of residual oxides including nitric oxide and nitrogen dioxide are passed from zone 12 through line 28 to a conventional power recovery system, which is not shown in the drawings. The oxidation absorption zone 12 and power recovery system comprise a conventional nitric acid plant.

A line 30 is connected from zone 12 to zone 14 for conveying the nitric acid solution which is generally from 55 wt. % to 65 wt. % $HNO_3$. In zone 14 additional ammonia is introduced and reacted with the nitric acid to form an ammonium nitrate solution which can vary from 83 wt. % to 93 wt. % ammonium nitrate according to the neutralization process used, which solution is conveyed to evaporation zone 16 through line 34.

Figure 2:
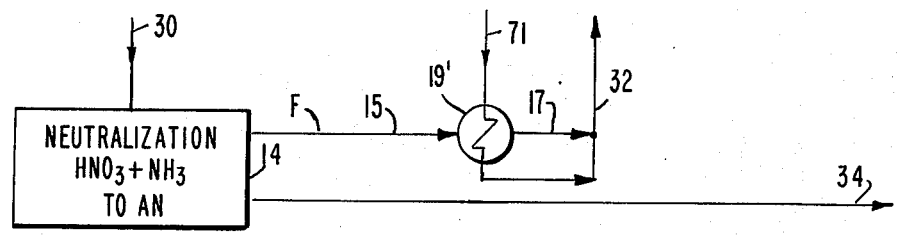
FIG. 2 is an enlarged schematic representation of an ammonium nitrate process neutralization stage showing the first contaminated vapor stream from neutralization being condensed by indirect heat exchange with the circulating stream of fertilizer solution.

In the formation of the ammonium nitrate solution in zone 14, various pollutants are also formed as a by-product which includes a vapor mixture of nitric acid, and an entrained solution of ammonium nitrate and water which has been designated by reference letter F passing in line 15. These pollutants are condensed by direct contact as shown in FIG. 1, in 19, or indirect contact as shown in FIG. 2 with a circulated fertilizer solution fed through line 71 from line 55' at 19'. In a system having indirect contact condensation, the condensate produced, shown as line 17 in FIG. 2, is combined with the circulated fertilizer solution to form a resultant heated contaminant stream. A line 32 conveys the resultant heated contaminant stream to line 57, which conveys it further to the pollution control system 20. The ammonium nitrate stream from zone 14 in line 34 is passed to the vacuum evaporator 16 in order to obtain a concentrated ammonium nitrate stream of from 94 wt. % to 99.5 wt. % ammonium nitrate. The concentration will depend usually on the required density of the solid product. For example, in the case of high density prills, an alternative procedure is to carry out evaporation in two steps with final concentration to 99.5 wt. % taking place in air sweep unit 35 that is connected to evaporation zone 16 by line 36 and is passed to the prilling tower 18 by means of a line 48. A pollutant stream of air and entrained particles of ammonium nitrate flows through line 53 and joins line 52 to make up a pollutant stream designated by the reference letter S, when an air sweep unit is used.

A third stream of contaminated vapor designated by the reference letter T, flows out of the vacuum evaporation operation 16 through line 54 and consists essentially of evaporated water contaminated with ammonium nitrate and ammonia. Stream 54 is connected with a vacuum condenser system which is shown as one stream ejector stage 25 with condenser 23 and an after condenser 27, but also may consist of two or more ejector stages. The heat of condensation of the vapor flowing in line 54 is transferred directly in the vacuum condensers 23 and 27 to a branched circulating stream 55' of dilute ammonium nitrate and ammonia from the top stage of the pollution control system 20. The heat transfer occurs in direct contact in barometric type condensers 23 and 27 in which the condensable portion of vapors condense in lines 58 and 59, respectively, and combine in line 57 with the circulating liquid from line 55. The heat transfer may also be performed indirectly by separating the condensing vapors from the circulating coolant by a heat transfer surface such as in conventional shell and tube heat exchanger design. In the present case, the condensate is formed in barometric condensers in direct contact with the circulated fertilizer solution coming from and returning to the pollution control system 20. Water from the neutralization and evaporization stages sent to the pollution control system 20, in lines 57 and 32, is principally the water fed to the nitric acid plant for absorption plus water produced by oxidation of ammonia. In some cases the water required in the absorber of the nitric acid plant, zone 12, may be obtained from either line 57 or 32, thus reducing the heat requirement in the system 20 and requiring additional cooling in cooler 92 located in line 50.

Inerts contained in vapor stream 54 are ejected from the after condenser 27 into the atmosphere through line 74. If this stream still contains significant amounts of contaminants, it may alternatively be introduced into the bottom of pollution control system 20 by extending line 57 to the pollution control system 20 as described above.

In the event that evaporation is carried out solely by air sweep evaporator 35, the upper section of the pollution control system 20 is eliminated together with the vacuum evaporator 16. Water vapor which would otherwise flow in line 54 would then flow in stream S together with sweep air into pollution control system 20.

In the event that the vapor in line 54 from the vacuum evaporation step 16 contains a high concentration of contaminants, it may not be feasible to combine the condensate from this stream with the coolant stream in 55, or recirculate this condensate separately at the top of the pollution control system 20 as previously described. Combination of the condensate from stream 54 with coolant in line 55 may increase the level of contaminants in line 57 to such that the scrubbing effect on the contaminated air is insufficient. This would also be true if the condensate were circulated separately at the top of pollution control system 20.

This problem may be overcome by two methods. First, by separating stream 58 and 59 from the barometric condenser, most contaminants should be contained in stream 58 which can be distributed over a third stage of scrubbing (not shown) in the tower of pollution control system 20 located between the two stages shown, or alternatively distributed over the bottom stage. In this manner only stream 59 would be returned to the top stage, and stream 55 would be taken from the bottom solution of the top stage. In this way the relatively pure condensate from the ejector and residual vapor from the condenser 27 is circulated over the final stage of scrubbing.

The second method of eliminating the problems of contaminants in the vacuum condensate, is to purify the condensate before introducing it into the top stage of pollution control system 20. This may be accomplished by conventional stream strippingg of volatile contaminants and returning these to the neutralization zone 14.

Solidification of the concentrated ammonium nitrate solution into a final product is accomplished conventionally by either prilling or granulation in zone 18. Both operations use air introduced through line 51 as coolant. Concentrated ammonium nitrate solution is dispersed into the moving air stream which absorbs the heat of fusion and sensible heat. In the case of prilling, the solution is dispersed as droplets which are released at the top of the prill tower. These fall by gravity in countercurrent relationship to the air introduced at the bottom and flow up through the tower. In the case of granulation, the solution is dispersed on a bed of solid ammonium nitrate particles that move downward through an inclined rotating drum. Air is introduced at one end of the drum and flows countercurrent to the bed to cool it.

In both operations, the heated air is exhausted and forms a second stream of contaminants consisting of air and entrained solid particles of ammonium nitrate, which has been designated by a directional arrow having the reference letter S. The second contaminant stream S is conveyed to the pollution control system 20 by means of line 52 which is connected between the solidification operation 18 and the bottom portion of the pollution control system 20 and air sweep unit 35 (when used) coupled between line 52 and the ammonium evaporator 16. Air sweep unit 35 introduces additional water, air, and entrained particles of ammonium nitrate to the second stream of contaminants.

In accordance with the present invention, the pollution control system 20 comprises a tower containing at least one liquid-gas contacting zone. In FIG. 1 there is shown a double stage system, while in FIG. 3 there is shown the alternative elements of a single or double stage system. When containing more than one contacting zone, the tower is divided into sections by a chimney plate 60 having chinmey openings 61 as shown in FIG. 1. The chimney plate 60 allows air and vapors to pass upward through chimney openings 61 which are covered with hats 66, so as to prevent liquid flowing downward from above from passing through the openings 61. The plate 60 maintains liquid at sufficient levels for recirculation pump 63 and allows liquid to flow down into lower section through small openings 62 after overflowing weirs 67. In this way the air and vapors pass upward without incurring the pressure drop of passing through the head of liquid required for pump 63. Other conventional designs, such as a bubble cap tray with tall caps, may be used for plate 60 instead of the weirs 67. It should be noted that where a very high degree of fertilizer recovery is required, the pollution control system would contain three or more contacting zones using relatively pure ejector stage evaporator condensate to feed the top contacting zone.

Both sections of the tower are provided with a conventional low pressure drop scrubbing media (64, 65) properly supported and retained. Alternatively, a plate type liquid gas contactor design such as bubble cap trays or sieve trays might be utilized.

Stream F is condensed in condenser 19 and enters the system 20 through lines 32 and 50. The contaminated air stream S passed in lines 53, and 52 enters the pollution control system 20 below scrubbing medium 64 in the bottom section. The combined air streams pass upward through lower scrubbing medium 64 where most of the contaminants are removed by a recirculating solution supplemented by overflowing solution from the top section. The resultant solution containing contaminants from S and an overflowing portion of F and T is recirculated by pump 68 through line 72. A portion of the recycled fertilizer solution is returned to the evaporation zone by line 73 for processing the recovered fertilizer into a solid product.

After passing through the lower scrubbing medium, the air passes through the upper scrubbing medium 65. Most of the solid particles and a large portion of the contaminating vapors are absorbed into the solution circulated in the bottom scrubbing medium 64. The remaining contaminants are removed in the top medium 65 by scrubbing with the relatively clean solution made up from evaporator and neutralizer process condensate. This solution is circulated by pump 63 through lines 55, 55', and 71, condensers 23, 27, and 19, and lines 58, 59, 57 and 50 as discussed above, where the heat of condensation is transferred to the solution. Also, the solution is replenished with relatively clean process condensate by direct contact as shown or indirect contact if desired as discussed above. In this way the heat of condensation of evaporated water is recovered by the recirculating solution to be transferred into the pollution control system 20. This heat provides the heat of vaporization required to evaporate excess process condensate into the air stream passing upward through medium 65. Thus, all excess water generated or added to the process is discharged through line 56 as a vapor into the atmosphere, and need not otherwise be discharged as a liquid. A benefit of adding process condensate to the tower is that the small remaining quantities of contaminants in the air stream leaving the bottom scrubbing medium 64 are removed with relatively uncontaminated process condensate.

In order to maintain the proper water balance so that the scrubbing solutions do not become depleted of water or that an excess occurs to necessitate liquid discharge, heat exchanger 92 is added to the scrubber solution return line 50. In the event that heat added by condensing vapors in condensers 23 and 27 is not sufficient to evaporate excess condensate in pollution control system 20, heat may be added through exchanger 92 to supply this difference. In the event that too much water is evaporated from pollution control system 20, heat can be withdrawn from the scrubber by applying cooling to exchanger 92.

Figure 3:
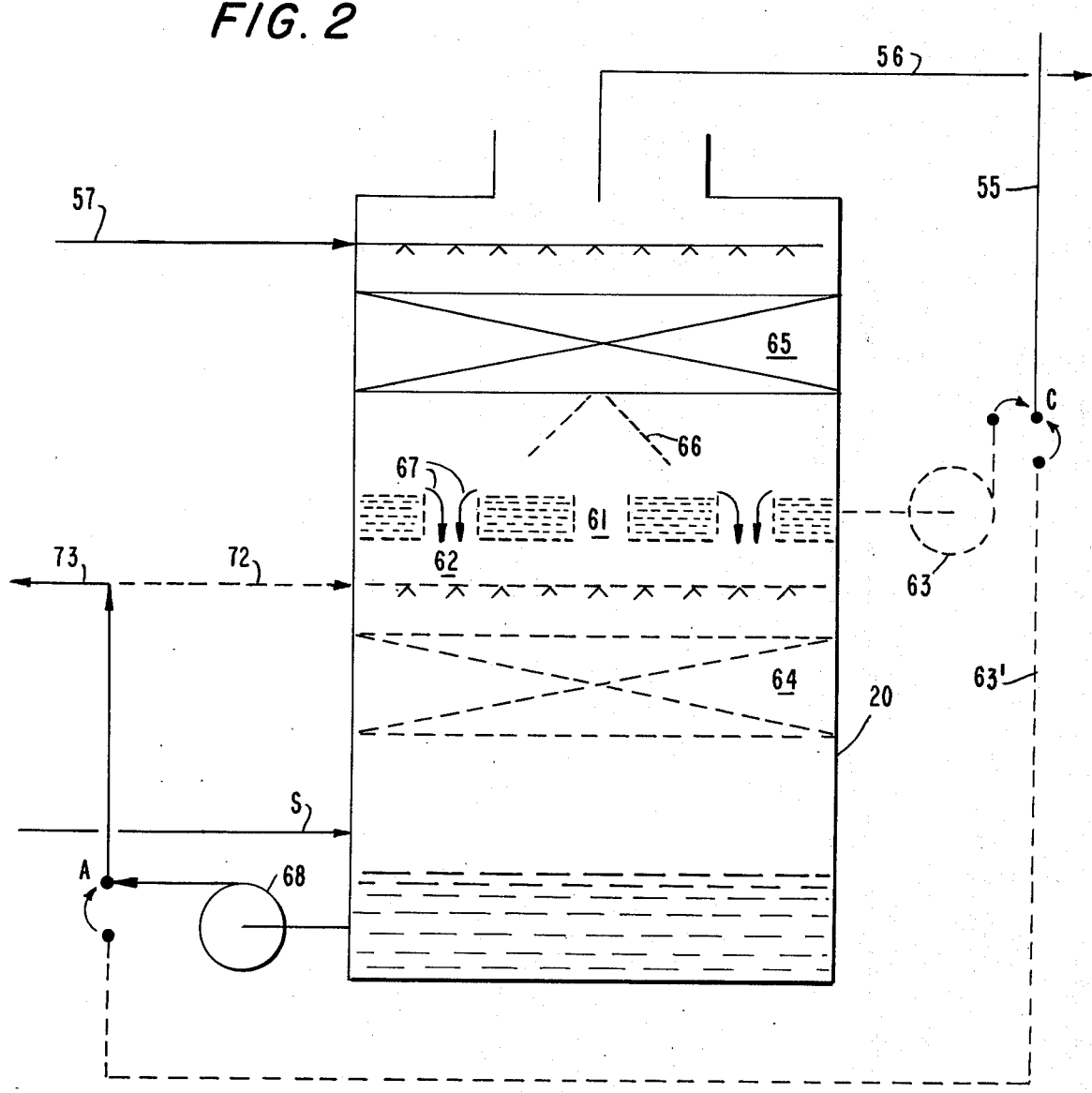
FIG. 3 is an enlarged schematic representation of the pollution control system of an ammonium nitrate process incorporating the present invention with solid lines depicting elements common to single and two stage systems, and broken lines depicting alternative elements of single and double stage systems.

In a single stage system, lower scrubbing medium 64, hats 66, plate 60 and pump 63 would not be included. Additionally, the resultant contaminant solution is re-moved from the bottom of system 20 by pump 68, and a portion is recirculated to the evaporation stage through line 73 as in a two stage system, yet another portion is recirculated to the neutralization and evaporator condensation stage through line 63', which is routed from node A to node C, as shown in FIG. 3, since pump 63 is not included in a two stage system. The resultant contaminant stream passing through line 63' is routed through the neutralization and evaporation stages and returned to the pollution control system via lines 32, 57 and 51.

An example of the present invention as applied to a typical ammonium nitrate production facility follows. This plant uses a neutralization process which produces 83 percent ammonium nitrate solution, part of which is sold as solution and the balance of which is evaporated in two steps and formed into prills for sale. Plant specification:

EXAMPLE I

| | |
|---|---|
| Nitric acid production | 500 tons/day as 100% $HNO_3$ (zone 12). |
| Nitric acid strength | 56% $HNO_3$ (zone 12). |
| Ammonium nitrate production | 635 tons/day as 100% $NH_4NO_3$ (zone 14). |
| Ammonium nitrate solution | 83% $NH_4NO_3$ (zone 14). |
| 83% solution sales | 185 tons/day as 100% $NH_4NO_3$ (zone 14). |
| High density prills made | 450 tons/day as 100% $NH_4NO_3$ (prill towel 18). |

| Pollutant streams fed to Pollution control system 20 in lbs/hr | Air | Water |
|---|---|---|
| (32) Neutralizer overhead | | 22,000 |
| (53) Air swept evaporator | 7,459 | 1,450 |
| (52) Prill tower vent | 723,000 | 11,980 |
| (54) Vacuum evaporator cond | | 7,000 |
| Wash water | | 30 |
| Effluent streams: | | |
| (56) From top of 29 to atmosphere (87% relative humidity) | 730,450 | 41,185 |
| (71) Recycle liquid | | 1,275 |

| Nitrate pollutant | Form | °F temp. |
|---|---|---|
| 16.65 | Vapor | 250 |
| 9.00 | Vapor | 330 |
| 61.50 | Vapor | 110 |
| 1.00 | Liquid | 140 |
| .30 | | |
| none | Vapor | 113 |
| 88.45 | Liquid | 120 |

Figure 4:
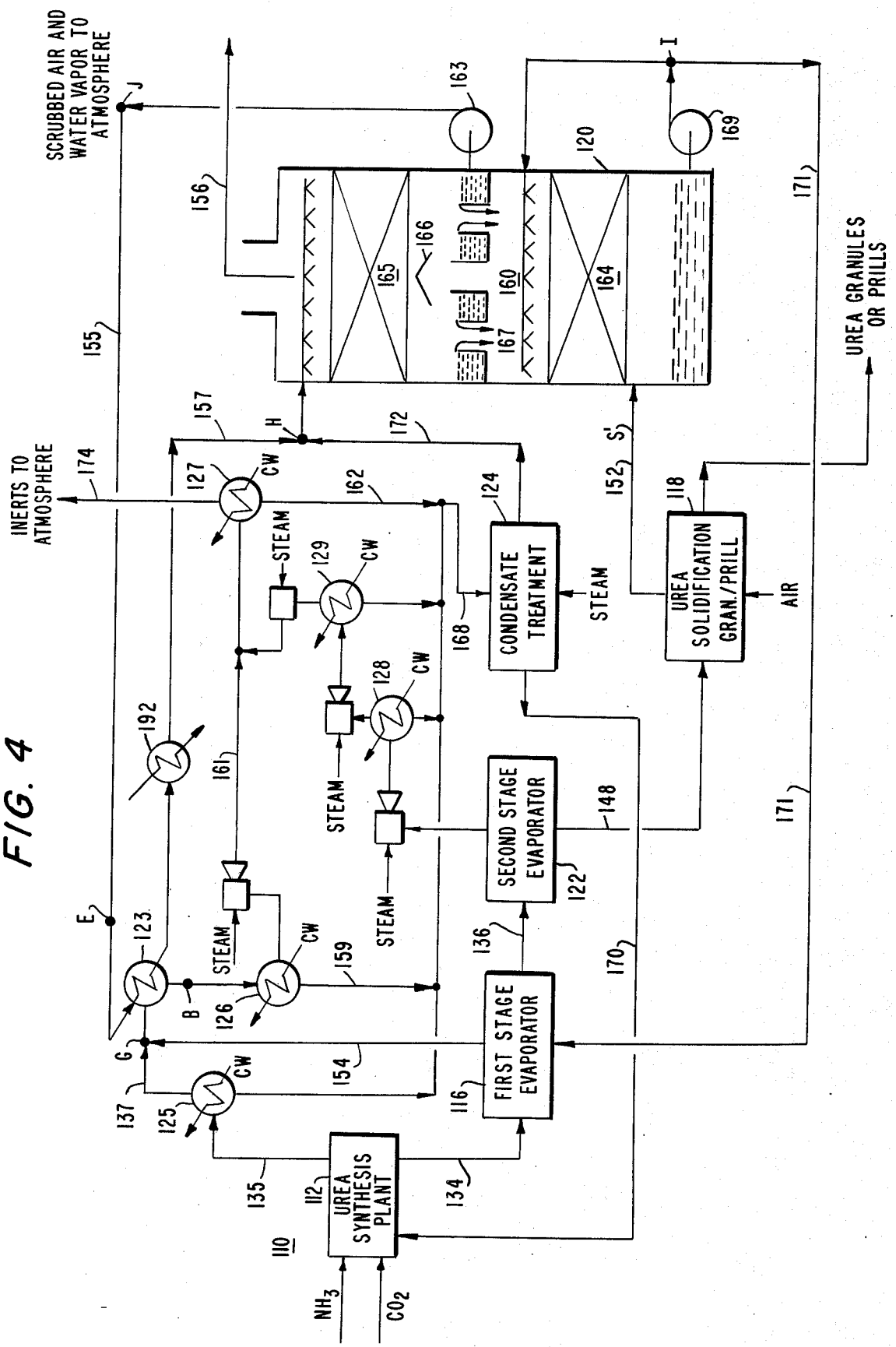
FIG 4 is a schematic representation of a urea process incorporating the present invention, having a double stage pollution control system.
Figure 5:
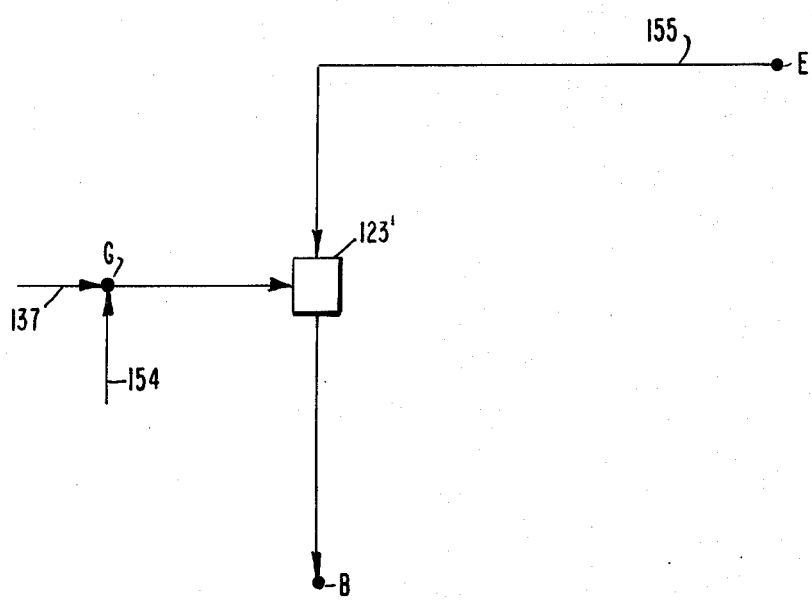
FIG. 5 is an enlarged schematic representation of an alternative evaporation stage for a urea process incorporating the present invention, with nodes G, E and B provided to show where this evaporation stage would be inserted in FIG. 4.
Figure 6:
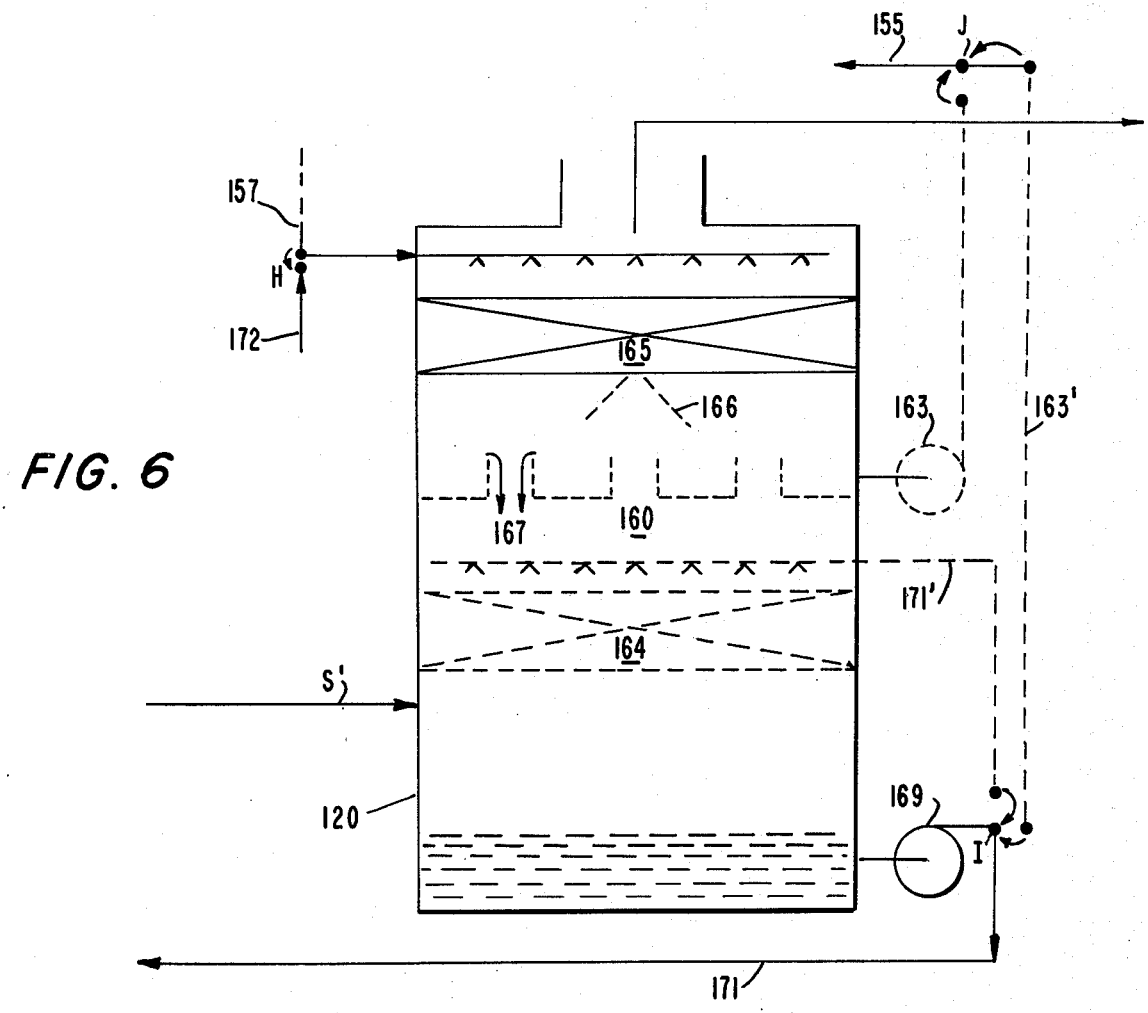
FIG. 6 is a blowup schematic representation of the pollution control system of a urea process incorporating the present invention with solid lines depicting elements common to single and two stage systems, and broken lines depicting alternative elements of single and double stage systems.

In FIGS. 4, 5 and 6 there is illustrated a further embodiment demonstrating objects and advantages of the invention in connection with the urea synthesis process in which corresponding parts have been designated by the same reference numerals as part of a "100" series. It should be noted that there is no corresponding neutralizer, or F stream, in the urea synthesis, process. Furthermore, in this second embodiment the evaporation stage is shown as being carried out in two vacuum stages.

In this form of the invention there is shown a urea fertilizer process generally designated by the reference number 110 which comprises a urea synthesis plant 112, a first stage evaporator 116, second stage evaporator 122, condensate treatment section 124, solidification section 118, and pollution control scrubber 120.

As is found in a typical urea process, the urea synthesis plant 112 consists of a reaction section and an ammonia, carbon dioxide recovery section. Ammonia and carbon dioxide are fed to an autoclave in the reaction section operating at high pressure where these react to form urea and water. The degree of conversion of carbon dioxide to urea per pass through the autoclave depends in commercial practice, on the ratio of ammonia to carbon dioxide maintained in the reactor. Urea processes generally operate economically at such conditions that conversions in the range of 65% to 75% are obtained leaving a considerable portion of unreacted ammonia and carbon dioxide in the effluent from the reactor. Most of this unreacted feed is separated from the urea water solution in the recovery section and is recycled back to the autoclave for further synthesis into urea. The method of separation and recycling depends on the particular process, but the usual result is a product from the urea synthesis plant 112 consisting of 65% to 75% by weight urea dissolved in by-product water and also containing a few weight percent ammonia and carbon dioxide. Throughout this discussion where ammonia and carbon dioxide are referred to as being present in a liquid phase, it is understood that these exist in the liquid as ammonium carbamate, carbonate and bicarbonate, the particular species depending on the concentration of water and ammonia to carbon dioxide ratio.

In a typical urea fertilizer process, water is evaporated from the solution product of the urea synthesis plant to produce a urea melt product containing less than 0.5 weight percent water, which is a suitable feed for the solidification processing. This is usually accomplished by evaporating the water in two vacuum evaporation stages 116 and 122. Urea solution from the urea synthesis 112 flows to the first stage evaporator by stream 134. A recycle stream 171 of urea solution containing urea recovered from the pollution control scrubber combines with stream 134 after entering the evaporator 116. The combined urea solution feed is evaporated to produce a feed solution for the second evaporator containing ordinarily 90 to 97 weight percent urea. This feed solution flows to the second evaporator by stream 136 where the remaining water is evaporated to produce urea melt containing typically 0.3 weight percent water which flows to the solidification section 118 by stream 148.

A typical ejector condenser system is shown for the two stage evaporator system discussed above. Water evaporated from the first evaporator stage 116 and contaminated with ammonia, carbon dioxide and entrained urea flows by stream 154 to indirect condenser 123 as shown in FIG. 4 In a typical urea synthesis plant a vapor stream at subatmospheric pressure is obtained through stream 135 which is contaminated with ammonia, carbon dioxide, and entrained urea. The stream is usually more highly contaminated than the vapor from the first evaporator in stream 154 and is condensed separately in condenser 125 by indirect contact with cooling water. Vapors and inerts from condenser 125 flow through stream 137 to combine with vapor from the first evaporator 116 flowing in stream 154. The combined vapors of streams 137 and 154 are partially condensed in condenser 123, when used, by indirect contact with stream 155 which consists of a dilute urea solution recirculated by pump 163, if a two stage pollution control system is used, or by pump 169 if a single stage pollution control system is used. FIG. 5 shows an alternative condensation stage, where the flow from lines 137 and 154 is added directly to that of line 155 at condenser 123', which is used instead of indirect condenser 123.

Vapors and condensate flow from condenser 123 to condenser 126 where most of the remaining vapor is condensed indirectly against cooling water. Condensate from condenser 126 flows out through stream 159 into the condensate treatment section 124 where the condensates from all the condensers in the vacuum condenser system are collected. Inerts and residual vapor are ejected from condenser 126 to atmospheric pressure through stream 161 to condenser 127 where the remaining vapor is condensed and sent to condensate treatment 124 through stream 162.

Urea solution product from the first evaporator 116 usually containing from 90 to 97 weight percent urea and from 0.2 to 1 weight percent ammonia and carbon dioxide flows to the second stage evaporator 122 by stream 136. Evaporator 122 operates at significantly lower pressure than evaporator 116 so as to minimize the formation of degradation products of urea, primarily biuret, which are accelerated by increasing temperature and decreasing water content. The second stage 122 usually requires three steam ejection stages with three stages of condensation shown as condensers 128, 129, and 127, which are of known design. Contaminated condensate from these condensers together with the condensates from condenser 125 and 126 flow in stream 168 into the condensate treatment section 124.

Urea melt from the second evaporator 122 containing less than 0.5 weight percent water flows in stream 148 to the urea solidification section 118 where it is converted into either granules or prills by methods discussed for ammonium nitrate production. The large quantity of air used to cool and solidify the urea leaves the solidification section 118 heated and contaminated with entrained urea dust and a small amount of ammonia. The contaminated air effluent S' flows in stream 152 into the bottom of the pollution control scrubber 120 to be purified.

Process condensate fed to the condensate treatment section in stream 168 is treated, conventionally by steam stripping, to separate ammonia and carbon dioxide which are recycled in stream 170 to the urea synthesis plant 112. The treated condensate typically containing 2000 to 10,000 ppm/w of urea and 50 ppm/w of ammonia is sent in stream 172 to the top of the scrubber 120.

In accordance with the present invention, the pollution control system 120 has the same internal configuration as described for the ammonium nitrate case FIG. 4 depicts the urea process having a two stage system, while FIG. 6 depicts elements common to both single and two stage systems by solid lines and alternative elements of single or two stage systems by broken lines. Three or more stages would be used for attaining a very high degree of fertilizer recovery. Briefly, as shown in FIG. 4, a two stage system comprises a tower divided into two sections by a chimney plate 160, each section containing a conventional liquid gas contacting medium identified as medium 164 for the bottom section and 165 for the top section.

Contaminated air S' from the solidification section 118 enters the system 120 through stream 152 underneath scrubbing medium 164. Most of the entrained urea dust is removed from the entering air by contact with urea solution recirculated over medium 164 by pump 169. Urea is absorbed into the recirculated urea solution and recycled to the first stage evaporator in stream 171 by pump 169 to be converted into urea fertilizer product. Water lost from the urea solution recirculated over scrubbing medium 164 by evaporation, in the contaminated air stream, and by recycling urea solution stream 171 is replenished by the dilute urea solution overflowing from the top stage of scrubber 120 through openings 167.

Air leaving the bottom scrubbing medium is still contaminated with a small amount of entrained urea solution and traces of ammonia vapor. This contaminated air stream enters the top section and passes through the top scrubbing medium 165 where it is scrubbed with a dilute solution of urea recirculated over the medium by pump 163. This solution absorbs residual entrained urea and ammonia vapor to produce an uncontaminated air effluent in stream 156 suitable for discharge into the atmosphere. The effluent air stream 156 also contains as vapor, water generated by and added to the process, so that no liquid effluent need be discharged from the plant. The water vapor results from evaporation of water from the urea solutions recirculated over both scrubbing medium 164 and 165. Water generated by and added to the process is supplied to the recirculating scrubbing solutions from condensate treatment section 124 through stream 172.

In a single stage system, the urea solution is recirculated from the bottom of the scrubber by pump 169, since pump 163 is not included, being routed from node I through line 163' to line 155 at node J. In a single stage system there is also no lower contact medium 164, plate 160, or hats 166.

Heat required for evaporating excess water from the recirculated solutions is obtained by recirculating the upper section scrubbing medium 165 solution by pump 163 through condenser 123, or 123' if used. The heat removed in condensing vapor entering condenser 123 in streams 154 and 137 is transferred through a heat exchanger surface to raise the temperature of the recirculated stream 155. This heat is removed from the recirculated stream 155 when it returns to the scrubber 120 as stream 157 by the evaporative effect of the contaminated air entering the scrubber 120. FIG. 5 shows an alternative evaporator stage wherein flow in lines 137 and 154 is combined directly with flow in line 155 at condenser 123', which is inserted in place of condenser 123 at nodes E, B and G. In such an embodiment line 157 would not be included also. By controlling the temperature of stream 157, the equilibrium partial pressure of water vapor over the solution in stream 157 is maintained sufficiently higher than the water vapor pressure in the effluent air stream 156 such that the required amount of water is evaporated. The result of passing the solution in stream 157 through the upper scrubbing medium 165 is that it cools as it contacts the air, and water evaporates as in conventional cooling tower operations.

In order to maintain the proper water balance so that the scrubbing solutions do not become depleted of water or that an excess does not occur to necessitate a liquid discharge, it is necessary to control the temperature of stream 157. This may be accomplished by transferring condenser load to or from condenser 123 by changing operating conditions thereof. The temperature of stream 157 may be decreased to cause less evaporation in scrubber 120 by either increasing the cooling water flow through condenser 126 or by introducing inerts into stream 172 so as to reduce the pressure on the vapor side of condenser 123. The temperature of stream 157 may be increased to cause more evaporation in scrubber 120 by either restricting the vapor flow in stream 158 from condenser 123 or by reducing the cooling water flow through condenser 126 so as to increase the pressure on the vapor side of condenser 123.

Additional flexibility with respect to water evaporation is obtained by heating the recirculating solution in line 157 with steam heater 192. Most urea processes produce an excess of low pressure steam which may be conveniently used for this purpose.

In the event it is desired to obtain a more pure air effluent stream 156 from the scrubber 120, the system may be modified to provide an additional stage of scrubbing. By installing another chimney plate over scrubbing medium 165 and extending the scrubber 120 upward to include an additional scrubbing medium over the added chimney plate, another stage is added. Process condensate taken directly from condensate treatment can be added to stream recirculating over the new upper stage instead of being mixed as shown in stream 172 with stream 157. Excess condensate in the new upper recirculating stream overflows the new chimney plate to replenish water losses from the lower sections. By this modification, the second stage serves to remove contaminants from the air stream which would otherwise be absorbed into the solution circulating over the upper stage, in addition to its primary function of evaporating water. Thus, the circulating solution of the upper new third stage is maintained relatively lower than the solution circulating over the intermediate second stage and the air leaving the second stage may be purified to a greater extent before being discharged into the atmosphere.

An example of the present invention as applied to a typical urea production facility follows. Plant specification:

EXAMPLE II

Granulated urea production . 1500 tons/day as 99.7% urea

Flowrating and temperatures of streams flowing to and from pollution control scrubber 120:

| Stream | Temperature and form | Flowrate in lbs/hrs | | | | |
|---|---|---|---|---|---|---|
| | | Air | $NH_3$ | $CO_2$ | Water | Urea |
| 152 | 187°F vapor | 895,200 | 50 | 50 | 7,502 | 18,750 |
| 172 | 141°F liquid | | 5 | 5 | 82,874 | 186 |
| 156 | 140°F vapor | 895,200 | 25 | 48 | 67,253 | 17 |
| 155 | 100°F liquid | | 60 | 59 | 1,166,414 | 50,377 |
| 155 | 145°F liquid | | 60 | 59 | 1,166,414 | 50,377 |
| 171 | 91°F liquid | | 30 | 7 | 23,123 | 18,919 |

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention.

What is claimed is:

1. In the manufacture of ammonium nitrate fertilizer including oxidation, absorption, neutralization, evaporation and solidification stages, the continuous process comprising the steps of:
   A. passing a liquid stream of ammonium nitrate solution in heat exchange relation with a stream of water vapor containing ammonium nitrate components generated as a by-product during said neutralization stage of said manufacture of fertilizer to condense said water vapor stream and thereby produce a first heated contaminant stream of ammonium nitrate solution;
   B. combining said first heated contaminant stream with a second contaminant stream containing a by-product generated during said evaporation stage to form a resultant liquid contaminant stream;
   C. passing said resultant liquid contaminant stream into an upper direct contact zone, a first portion of said resultant liquid contaminant stream further passing to a lower direct contact zone;
   D. passing a third contaminant stream of air and entrained solid particles of ammonium nitrate into said lower direct contact zone in direct contact heat exchange relation with said first portion of said resultant liquid contaminant stream, and dissolving a portion of said entrained solid ammonium nitrate particles into said first portion of said resultant liquid contaminant stream and evaporating a portion of water from said first portion of said resultant liquid contaminant stream thereby cooling said first portion of said resultant liquid contaminant stream and yielding a heated resultant gaseous contaminant stream;
   E. passing said heated resultant gaseous contaminant stream into said upper direct contact zone for contact with said resultant liquid contaminant stream and dissolving another portion of said entrained solid ammonium nitrate particles into said resultant liquid contaminant stream, and evaporating a portion of water from said resultant liquid contaminant stream, thereby cooling said resultant liquid contaminant stream and yielding a stream of substantially pure water vapor and air;
   F. ejecting said stream of substantially pure water vapor and air from said upper direct contact zone;
   G. recirculating a second portion of said resultant liquid contaminant stream to said evaporation stage of said manufacture of ammonium nitrate fertilizer, and a third portion of said resultant liquid contaminant stream to said neutralization stage of said manufacture of ammonium nitrate fertilizer;
   H. recycling a part of said first portion of said resultant liquid contaminant stream from said lower direct contact zone to said evaporation stage of said manufacture of ammonium nitrate fertilizer; and
   I. recirculating a remaining part of said first portion of said first contaminant stream from said lower direct contact zone to the top of said lower direct contact zone.

2. In the manufacture of ammonium nitrate fertilizer including oxidation, absorption, neutralization, evaporation and solidification stages, the continuous process comprising the steps of:
   A. passing a first liquid stream of ammonium nitrate solution in heat exchange relation with a stream of water vapor containing ammonium nitrate components generated as a by-product during said neutralization stage of said manufacture of fertilizer to condense said water vapor stream and thereby produce a first heated contaminant stream of ammonium nitrate solution;
   B. combining said first heated contaminant stream with a second contaminant stream containing a by-product generated during said evaporation stage of said manufacture of fertilizer to form a resultant liquid contaminant stream;
   C. passing said resultant liquid contaminant stream into a direct contact zone;
   D. passing a third heated contaminant stream of air and entrained solid particles of ammonium nitrate into a direct contact zone in direct contact heat exchange relation with said resultant liquid contaminant stream, dissolving a portion of said entrained solid ammonium nitrate particles into said resultant liquid contaminant stream, evaporating a portion of water from said resultant liquid contaminant stream thereby cooling said resultant liquid contaminant and yielding a stream of substantially pure water vapor and air;
   E. ejecting said stream of substantially pure water vapor and air from said direct contact zone;
   F. recirculating a first portion of said cooled resultant liquid contaminant to said evaporation stage of said manufacture of fertilizer, and a second portion of said cooled resultant liquid to said neutralization stage as said first liquid stream; and
   G. recycling a remaining portion of said cooled resultant liquid to said evaporation stage of said manufacture of ammonium nitrate fertilizer to become a portion of said second contaminant stream.

3. In the manufacture of urea fertilizer, including synthesis, evaporation, and solidification stages, the continuous process comprising the steps of:
   A. passing a first liquid stream of urea solution in heat exchange relation with a stream of water vapor containing urea components generated as a by-product during said evaporation stage of said manufacture of fertilizer to condense said water vapor stream and thereby produce a first heated contaminant stream containing a volatile portion of ammonia and carbon dioxide;
   B. treating said first heated contaminant stream to remove said volatile portion of ammonia and carbon dioxide;
   C. combining said first liquid stream of urea solution with said treated first heated contaminant stream to form a resultant liquid contaminant stream;
   D. passing said resultant liquid contaminant stream to an upper direct contact zone, a first portion of said resultant liquid contaminant stream further passing to a lower direct contact zone, accumulating as a cooled liquid in said lower direct contact zone;
   E. circulating a portion of said accumulated cooled liquid in said lower direct contact zone to the top of said lower direct contact zone;

F. passing a second heated contaminant stream of air and entrained solid particles of urea into said lower direct contact zone in direct contact heat exchange with said circulated portion of said accumulated cooled liquid, and dissolving a portion of said entrained solid particles of urea into said circulated portion of said accumulated cooled liquid, and evaporating a portion of water from said circulated portion of said accumulated cooled liquid, thereby further cooling said circulated portion of said accumulated cooled liquid, and yielding a heated resultant gaseous contaminant stream;

G. passing said heated resultant gaseous contaminant stream into said upper direct contact zone for contact with said resultant liquid contaminant stream, and dissolving another portion of said entrained solid particles of urea into said resultant liquid contaminant stream, and evaporating a portion of water from said resultant liquid contaminant stream, thereby cooling said resultant liquid contaminant stream and yielding a stream of substantially pure water vapor and air;

H. ejecting said stream of substantially pure water vapor and air from said upper direct contact zone;

I. circulating the remaining portion of said accumulated cooled liquid in said lower direct contact zone to said evaporation stage;

J. recycling the remaining portion of said resultant liquid contaminant stream containing entrained solid particles of urea to said evaporation stage of said manufacture of urea as said first liquid stream of urea solution.

4. In the manufacture of urea fertilizer, including synthesis, evaporation, and solidification stages, the continuous process comprising the steps of:

A. combining a first liquid stream of urea solution in heat exchange relation with a stream of water vapor containing urea components generated as a by-product during said evaporation stage of said manufacture of fertilizer condensing said water vapor stream and thereby produce a first heated contaminant stream containing a volatile portion of ammonia and carbon dioxide;

B. treating said first heated contaminant stream to remove said volatile portion of ammonia and carbon dioxide;

C. passing said treated first heated contaminant stream to an upper direct contact zone, a first portion of said treated first heated contaminant stream further passing to a lower direct contact zone, accumulating as a cooled liquid in said lower direct contact zone;

D. circulating a portion of said accumulated cooled liquid in said lower direct contact zone to the top of said lower direct contact zone;

E. passing a second heated contaminant stream of air and entrained solid particles of urea into said lower direct contact zone in direct contact heat exchange with said circulated portion of said accumulated cooled liquid, and dissolving a portion of said entrained solid particles of urea into said circulated portion of said accumulated cooled liquid, and evaporating a portion of water from said circulated portion of said accumulated cooled liquid, thereby further cooling said circulated portion of said accumulated cooled liquid, and yielding a heated resultant gaseous contaminant stream;

F. passing said heated resultant gaseous contaminant stream into said upper direct contact zone for contact with said treated first heated contaminant stream, and dissolving another portion of said entrained solid particles of urea into said treated first heated contaminant stream, and evaporating a portion of water from said treated first heated contaminant stream, thereby cooling said treated first heated contaminant stream and yielding a stream of substantially pure water vapor and air;

G. ejecting said stream of substantially pure water vapor and air from said upper direct contact zone;

H. circulating the remaining remaining portion of said accumulated cooled liquid in said lower direct contact zone to said evaporation stage;

I. recycling the remaining portion of said treated first heated contaminant contaminant stream containing entrained solid particles of urea to said evaporation stage of said manufacture of urea as said first liquid stream of urea solution.

5. In the manufacture of urea fertilizer, including synthesis, evaporation, and solidification stages, the continuous process comprising the steps of:

A. passing a first liquid stream of urea solution in heat exchange relation with a stream of water vapor containing urea components generated as a by-product during said evaporation stage of said manufacture of fertilizer to condense said water vapor stream and thereby produce a first heated contaminant stream containing a volatile portion of ammonia and carbon dioxide;

B. treating said first heated contaminant stream to remove said volatile portion of ammonia and carbon dioxide;

C. combining said first liquid stream of urea solution with said treated first heated contaminant stream to form a resultant liquid contaminant stream;

D. passing said resultant liquid contaminant stream to a direct contact zone;

E. passing a second heated contaminant stream of air and entrained solid particles of urea into said direct contact zone in direct contact heat exchange with said resultant liquid contaminant, and dissolving a portion of said entrained solid particles of urea into said resultant liquid contaminant, and evaporating a portion of water from said resultant liquid contaminant, thereby cooling said resultant liquid contaminant, and yielding a resultant gaseous stream of substantially pure water vapor and air;

F. ejecting said stream of substantially pure water vapor and air from said direct contact zone;

G. circulating a portion of said resultant liquid contaminant containing said entrained solid particles of urea to said evaporation stage;

H. recycling the remaining portion of said resultant liquid contaminant stream containing entrained solid particles of urea to said evaporation stage of said manufacture of urea as said first liquid stream of urea solution.

6. In the manufacture of urea fertilizer, including synthesis, evaporation, and solidification stages, the continuous process comprising the steps of:

A. combining a first liquid stream of urea solution in heat exchange relation with a stream of water vapor containing urea components generated as a by-product during said evaporation stage of said manufacture of fertilizer condensing said water vapor stream and thereby produce a first heated contaminant stream containing a volatile portion of ammonia and carbon dioxide;

B. treating said first heated contaminant stream to remove said volatile portion of ammonia and carbon dioxide;

C. passing said treated first heated contaminant stream to a direct contact zone;

D. passing a second heated contaminant stream of air and entrained solid particles of urea into said direct contact zone in direct contact heat exchange with said treated first heated contaminant stream, and dissolving a portion of said entrained solid particles of urea into said treated first heated contaminant stream, and evaporating a portion of water from said treated first heated contaminant stream, thereby cooling said treated first heated contaminant stream and yielding a resultant gaseous stream of substantially pure water vapor and air;

E. ejecting said stream of substantially pure water vapor and air from said direct contact zone;

F. circulating a portion of said treated first heated contaminant stream containing entrained solid particles of urea to said evaporation stage;

G. recycling the remaining portion of said treated first heated contaminant stream containing entrained solid particles of urea to said evaporation stage of said manufacture of urea as said first liquid stream of urea solution.

* * * * *